Patented Dec. 24, 1946

2,412,947

UNITED STATES PATENT OFFICE 2,412,947

DRY CASTING SOLUTION OF CELLULOSE ACETATE

Gilbert W. Brant, Buffalo, N. Y., assignor to E. I. du Pont de Nemours & Company, Wilmington, Del., a corporation of Delaware No Drawing. Application January 19, 1944, Serial No. 518,867

5 Claims. (Cl. 106—181)

This invention relates to improvements in the manufacture of cellulose acetate film. More particularly, this invention relates to an improved cellulose acetate composition suitable for dry casting by conventional methods, and which after evaporation of the major portion of the solvent, can be easily stripped from the casting surface.

Heretofore, in the manufacture of cellulose acetate films by the evaporative casting method, it has been customary to add to the casting dope, a small amount of material to render the partially dried film readily strippable from the casting surface. Materials used for this purpose are usually electrically conductive in character. When this type film is used for electrical purposes as, for example, covering on wires, the insulation resistance is very markedly impaired due to the presence of the electrically conductive stripping agent. On the other hand, when an attempt is made to dry-cast cellulose acetate film from solutions containing no stripping agent, the removal of the partially dried film from the casting surface requires so much tension that the films are badly distorted and not infrequently are torn, and may even cause an interruption in the continuity of the process.

It is, therefore, an object of this invention to provide a new cellulose acetate film-forming composition which is free of electrically conductive materials and therefore capable of producing a film having desirable electrical properties and without casting difficulties. A further object is to provide a method for decreasing the adhesion between freshly dry-cast cellulose acetate film and the casting surface. Still another object is to prepare electrically non-conducting cellulose acetate dry-cast film which is easily removable from the casting surface. Other objects will be apparent from the description that follows.

I have found that if a small amount of a water-insoluble cellulose ether which is not compatible with cellulose acetate is incorporated in the cellulose acetate casting solution, the partially dried film formed therefrom is easily stripped from the casting surface with greatly reduced tension.

By the term "cellulose acetate" as used throughout this specification, I not only include the simple ester but cellulose acetate mixed esters so long as the substituent groups are predominantly acetate.

Any of the cellulose ethers which are insoluble in water and incompatible with cellulose acetate, e. g., ethyl cellulose, benzyl cellulose, cellulose glycollic acid, mixed ethers, etc., are suitable for the purposes of my invention.

The amount of cellulose ether incorporated in the film-forming composition may be varied quite widely. Useful results may be obtained with as little as 0.1% based on the total weight of the solid comprising the film-forming composition, although in some cases as much as 5% may be used advantageously without changing the essential character of the cellulose acetate film.

To further illustrate this invention, the following specific example is given. Parts are by weight unless otherwise indicated.

Example

A cellulose acetate casting solution was prepared by dissolving 74.8 parts of acetone-soluble cellulose acetate (about 54.5% combined acetic acid), 0.2 part of ethyl cellulose (about 49% ethoxy content) and 25 parts of dibutyl phthalate in 300 parts of acetone. After thoroughly mixing, filtering and deaerating, the dope was spread out on a heated, smooth, nickel-surfaced casting plate by means of a doctor knife to a uniform and constant thickness. When the solvent had substantially completely evaporated, the film was stripped from the plate and the stripping tension noted. It was found that the tension required to strip the film from the plate was only about 120 grams whereas a film similarly formed from a like composition but containing no ethyl cellulose or other stripping agent required a stripping tension of about 250 grams.

Similarly it was found that by taking cellulose acetate butyrate or cellulose acetate propionate the stripping tension could be markedly improved by incorporating a small amount of ethyl cellulose in the casting solution. For example, film compositions comprised of about 71% cellulose acetate butyrate or cellulose acetate propionate with 4% ethyl cellulose and 25% dibutyl phthalate as a plasticizer were found to strip easily and with only about 11% of the tension required if the composition contained no ethyl cellulose or other stripping agent. Likewise a cellulose acetate composition containing 4% benzyl cellulose was found to strip with only about ½ of the tension required to strip a similar film containing no benzyl cellulose or other stripping agent.

Not only does a small amount of the water-insoluble cellulose ether greatly improve the strippability of cellulose acetate film from metal casting surfaces, such as nickel, chromium, stainless steel, etc., but the film produced has good slip on its casting surface side. This is another important advantage of this invention because cut sheets of film piled up or a roll of film can be separated from the adjacent surfaces with much less difficulty than was heretofore possible in the case of many films. Thin films of cellulose acetate, particularly if plasticized, are usually sized with a size containing electrically conductive materials in order to obtain enough slip to cause adjacent surfaces to slide and wind up without wrinkling and to prevent sticking or blocking. Furthermore, the absence of an electrolyte in the cellulose acetate film, makes it generally suitable for electrical purposes where high insulation resistance and high dielectric strength are needed.

As many apparently widely different embodiments of this invention may be made without departing from the spirit and scope thereof, it is to be understood that this invention is not limited to the specific embodiments thereof except as defined in the appended claims.

I claim:

1. An organic solvent, dry casting solution of a cellulose acetate containing, as a strip agent, from 0.1% to 5% of a water-insoluble cellulose ether not compatible with cellulose acetate.

2. An organic solvent, dry casting solution of a cellulose acetate containing, as a strip agent, from 0.1% to 5% of ethyl cellulose.

3. A dry casting solution of cellulose acetate dissolved in acetone and containing, as a strip agent, from 0.1% to 5% of a water-insoluble cellulose ether not compatible with cellulose acetate.

4. A dry casting solution of cellulose acetate and a plasticizer dissolved in acetone and containing, as a strip agent, from 0.1% to 5% of ethyl cellulose.

5. A dry casting solution consisting of 74.8 parts by weight of acetone-soluble cellulose acetate, 25 parts of dibutyl phthalate, 0.2 part of ethyl cellulose, and 300 parts of acetone.

GILBERT W. BRANT.